United States Patent
Pope et al.

[11] Patent Number: 5,405,541
[45] Date of Patent: Apr. 11, 1995

[54] WATER TREATMENT PROCESS

[75] Inventors: Daniel H. Pope, Georgetown, Tex.; Dennis R. Honchar, Ellicott City; Wilbur L. Medairy, Elkridge, both of Md.

[73] Assignee: Baltimore Aircoil Company, Inc., Jessup, Md.

[21] Appl. No.: 900,244

[22] Filed: Jun. 17, 1992

[51] Int. Cl.$^6$ ............................................. C02F 1/50
[52] U.S. Cl. .................................. 210/753; 210/705; 210/766
[58] Field of Search ............... 210/753, 766, 748, 759, 210/765, 764

[56] References Cited

U.S. PATENT DOCUMENTS

| | | | |
|---|---|---|---|
| 3,326,747 | 6/1967 | Ryan et al. | 210/753 |
| 3,598,372 | 8/1971 | Schneider, Jr. et al. | 261/110 |
| 3,684,477 | 8/1972 | Blumbergs et al. | 71/67 |
| 3,956,502 | 5/1976 | Slovinsky et al. | 424/304 |
| 3,996,155 | 12/1976 | Slovinsky et al. | 252/312 |
| 4,010,277 | 3/1977 | Swered et al. | 424/298 |
| 4,059,522 | 11/1977 | Polley et al. | 210/753 |
| 4,100,052 | 7/1978 | Stillman | 204/268 |
| 4,125,719 | 11/1978 | Grier et al. | 544/215 |
| 4,172,786 | 10/1979 | Humphery et al. | 210/57 |
| 4,555,347 | 11/1985 | O'Dowd et al. | 210/766 |
| 4,681,948 | 7/1987 | Worley | 548/319 |
| 4,732,689 | 3/1988 | Harvey et al. | 210/754 |
| 4,816,061 | 3/1989 | Walter, Jr. et al. | 71/67 |
| 4,839,064 | 6/1989 | McBurney et al. | 210/806 |
| 4,906,387 | 3/1990 | Pisani | 210/766 |
| 4,986,902 | 1/1991 | Serna | 210/86 |
| 5,015,660 | 5/1991 | Hidaka et al. | 514/441 |
| 5,025,002 | 6/1991 | Effenberger et al. | 514/112 |
| 5,057,229 | 10/1991 | Schulenburg | 210/743 |
| 5,057,612 | 10/1991 | Worley et al. | 548/301 |

*Primary Examiner*—Thomas Wyse
*Attorney, Agent, or Firm*—Edward J. Brosius; F. S. Gregorczyk; Thomas J. Schab

[57] ABSTRACT

The present invention comprises an improved method and apparatus for treating water in heat exchange systems. The present invention automatically and inexpensively provides an effective chemical to process water systems at times and in proportion to the need for water treatment in such systems. When used in evaporative cooling systems, the present invention adds the treatment chemical to the system via the make-up water. The make-up water acquires a substantially constant concentration of treatment chemical as it is passed through a device containing a treatment chemical. The constant concentration of chemical is achieved by dividing the make-up flow into two streams within the device, saturating the smaller of the two streams with chemical, and re-mixing the two streams. The biocide agent used in the preferred embodiment of the invention is prilled elemental iodine.

6 Claims, 4 Drawing Sheets

WATER TREATMENT PROCESS

FIELD OF THE INVENTION

This invention relates generally to the field of process water treatment. More specifically, the present invention provides an improved method and apparatus for adding water treatment chemicals to the recirculating water system in evaporative heat exchange equipment.

BACKGROUND OF THE INVENTION

Evaporative heat exchange and air cleaning equipment is well known in the art and includes cooling towers, evaporative condensers, closed circuit evaporative fluid coolers, direct evaporative coolers, air washers and gas scrubbers, among others.

Evaporative heat exchange equipment is typically used to provide cooling to a process by rejecting heat from the process to the atmosphere. In operation, evaporative heat exchange equipment is used to contact heated water from a process with air. During this contact, heat and mass transfer occur simultaneously, resulting in a portion of the water being evaporated into the air. The energy required to evaporate the water is supplied from the sensible heat of the water which is not evaporated. Accordingly, the temperature of the non-evaporated water is reduced and cooling has been accomplished. The cooled water is then circulated back to the process wherein it picks up additional heat. The heated water then is recirculated back to the evaporative heat exchange equipment for cooling.

The water that is recirculated through evaporative cooling equipment becomes contaminated with impurities during operation. These contaminates are introduced to the recirculated water in several ways.

For example, airborne impurities become washed out of the air into the recirculated water with which it is brought in contact. These impurities are typically suspended in the recirculated water and over time, can possibly block or clog passageways within the system, or cause corrosion problems.

Also, dissolved solids contained in the water which is evaporated are left behind in the recirculating water during the evaporation process. Further worsening the situation is the fact that additional dissolved solids are introduced to the system via the make-up water which is added to the system to replenish the water which is evaporated. As a result of this evaporation and replenishment, the dissolved solids' level in the recirculated water can rapidly increase to unacceptable levels and can cause scaling of heat transfer surfaces and corrosion of system components.

Finally, biological organisms are constantly being added to the evaporative heat exchange system through the make-up water and from the air which is passed through the tower. The warm, moist, oxygen rich environment of evaporative cooling equipment represents a prime habitat for biological growth. Microbiological growth typically comprises algaes, slimes and bacteria. These growths can cause fouling of heat transfer surfaces resulting in reduced operating efficiency, and in severe cases, can completely block passageways within the system.

Due to the tendency of recirculated water to become contaminated during the operation of evaporative heat exchange equipment, it is typically necessary to treat the recirculated water to maintain its quality within acceptable levels. Generally, this treatment entails several different processes.

The level of dissolved solids present in the recirculated water is typically controlled through a process of bleeding off a portion of the high dissolved solids containing recirculating water and replacing it with fresh make-up water. In cases where simple bleed and fresh water replenishment is insufficient to control the scaling or corrosive tendency of the recirculating water, specialized scale and corrosion inhibiting water treatment chemicals are also used. Microbiological growth is generally difficult to effectively and efficiently control within evaporative cooling systems. This difficulty arises in part from the variable conditions which are present in such systems. This is especially true when evaporative heat exchange equipment is used in comfort cooling, or air conditioning systems where conditions under which the equipment operate are constantly changing.

For example, in an air conditioning system, air conditioning is typically required during the warm period of the day. During this time the load, or the amount of heat that must be rejected from the evaporative cooling equipment, is generally greatest. As the load increases, the temperature of the recirculated water increases and the amount of air that is passed through the tower may also increase. During such periods, the rate of microbiological growth within the system and the rate of addition of microbiological organisms to the system are at the highest levels.

Similarly, as the outdoor temperature begins to fall during the evening hours and the need for air conditioning decreases, the load on the evaporative cooling equipment and the temperature of the recirculating water also decreases. During such periods, the rate of microbiological growth and the rate of addition of microbiological organisms is lowered.

In general, biological growth within evaporative heat exchange systems is controlled through the addition of biocide chemicals to the recirculating water. Several different methods typically have been utilized to add biocides to the recirculating water of evaporative heat exchange equipment. A common approach is to pump liquid biocide chemicals from a drum or some other container directly into the recirculating water system. Generally, this is done on a timed basis with a pre-set amount of liquid biocide being added periodically, usually on an hourly or daily basis. In some cases, the amount of biocide chemical pumped into the system is done in response to a measured biocide concentration within the recirculating water system.

Unfortunately, such automatic biocide, feed systems are expensive and require human attention to ensure that the proper amount of biocide chemical is being supplied to the recirculated water system. In addition, the operator must periodically replace the chemical drum or container when it is empty. Further, in those cases where biocide chemicals are added on a timed bases, biocide chemical is typically overfed during times when the rate of biological growth is low and underfed when the rate of biological growth is high.

Another method that has been used to supply biocide chemicals to the recirculated water of evaporative heat exchange equipment is to pass a side stream flow of the recirculating water through a bed of solid biocide chemicals, As the side stream flows through the bed of chemicals, a portion of the biocide chemicals are dissolved into the water stream. However, in order to prevent the particulate matter contained within the recirculating water from clogging or plugging the chemical bed, it is typically necessary to filter the side stream water passing through the chemical bed to remove such particulate matter prior to its entering the chemical bed.

A final method which has been used to add biocide and other treatment chemicals to recirculating water systems is to manually "hand-dose" or "slug-feed" the chemicals to the evaporative heat exchange equipment. Typically, this method is chosen on smaller systems, where the cost of expensive automatic feeding systems cannot be justified.

When using the "hand-dose" method, the operator must manually add large quantities of treatment chemicals to the recirculating water system on a periodic basis, usually once or twice weekly. Obviously, such a method results in erratic corrosion, scaling and microbiological control and can potentially cause serious health hazards when pathogenic organisms are present in the system. For example, if the time between slug doses of biocide is sufficiently large, and if the pathogen present in the system has a rapid growth rate, the population of the pathogen can increase between doses of biocide to potentially dangerous levels.

Another problem that must be addressed by any microbial control method is the potential for buildup of biofilms and deposits on system components. Most biocides are formulated and designed to attack microbiological organisms which are free in the bulk water. Such biocides are much less effective when used to control microorganisms contained within biofilms and deposits. This ineffectiveness could be due to the biocides' inability to penetrate the deposit or biofilm or due to the fact that the biocides are consumed by reactions in the water phase or at the surface of the film or deposit.

In light of the above, it is important in controlling these problems in evaporative heat exchange equipment that treatment chemicals are added in proportion to the need for chemical control within the system and that some level of treatment be maintained within the system at all times. Treatment chemicals should be added in proportion to their need within the system in order that the concentration of treatment chemical within a system can be held relatively constant. For example, this will result in the effective control of the microbial populations while using the minimum amount of biocide chemical. In addition, a continual presence of biocide, even at low concentrations, is needed to effectively control microbiological deposits and biofilms.

SUMMARY OF THE INVENTION

It is an object of the present invention to provide an improved method and apparatus for treatment of process water. When applied to evaporative heat exchange systems, the present invention provides an effective means for controlling the growth of microbiological organisms, and limit microbiologically-induced corrosion and scaling, while optimizing treatment chemical usage. In addition, this invention requires minimal capital investment and may be operated for extended periods of time without requiring human attention.

In the present invention, a canister is installed in the line supplying make-up water to the evaporative heat exchange equipment. The canister comprises a top section and a bottom section. The bottom section is filled with a solid phase, treatment chemical. The top section has an internal passageway for make-up water to flow through and has a means for dividing a small sidestream flow from the major flow stream. This side stream is directed down through the bottom section of the canister wherein it dissolves a portion of the treatment chemical. In fact, in passing through the treatment chemical, this side stream actually reaches saturation concentration. The saturated stream is then mixed back into the primary make-up stream flowing through the top section of the canister resulting in a make-up water stream containing a fixed amount of treatment chemical.

In evaporative heat exchange systems, the rate of make-up water flow into the system is substantially proportional to the need for microbial control within the recirculated water. That is, at times when the make-up flow into the evaporative heat exchange system is high, the need for control in the system is also generally high, and vice versa. Therefore, by adding treatment chemical to the evaporative cooling equipment through the make-up line in the present invention, the rate of chemical addition to the recirculated water system is synchronized with the amount of treatment chemical required in the system for microbial scale or other control. Accordingly, the present invention optimizes treatment, chemical usage.

Another advantage in feeding treatment chemicals via the make-up water supply is that the chemicals can be fed using a side stream feeder without the risk of clogging or plugging the feeder or without the need to filter the water prior to its passing through the filter. In most prior art systems where "pot-type" feeders are used, a portion of the recirculating water is pumped from the system through the pot feeder and back into the system. Unfortunately, the contaminates present in the recirculated water often clog or plug the feeder, thereby reducing its efficiency. As a result, in such prior systems, it is necessary to filter the recirculating water to remove the contaminates prior to its passing through the feeder. The present invention eliminates this problem since the make-up water passing through the device of the present invention is clean and free of such particulate matter. In fact, the make-up water used in most evaporative heat exchange equipment is potable water obtained from the municipal water supply.

Corrosion in such evaporative heat exchange systems is usually controlled by a chemical addition such as potassium dichromate or polyphosphonates. However, microbiological induced corrosion is related to the process of biological deposits and can be controlled by the addition of a biocide. Scaling is typically controlled by the addition of sodium bisulphate to the water in such evaporative cooling systems. However, scaling can be related to biological deposits and thereby also controlled by the addition of a biocide.

The choice of biocide chemical is critical in the present invention. Elemental iodine is preferred because of its efficacy in controlling microbiological organisms when used at relatively low, environmentally acceptable concentrations. In addition, elemental iodine has a low solubility in water. This characteristic allows the side stream flowing through the bottom section of the canister to reach its iodine saturation concentration. However, it is understood that iodine, chlorine and bromine containing compounds may also be utilized as such biocide chemicals. Once the side stream becomes saturated with iodine, the concentration of iodine within the side stream will remain constant. Thus, when this side stream is added back into the primary make-up water flow, the concentration of iodine in the resulting make-up flow will also be substantially constant.

The use of iodine in conjunction with the side stream in the present invention also prevents excessive biocide chemical from being dissolved and wasted at times when the biological growth rate within the system is small. Once the side stream has reached its iodine saturation concentration, additional iodine will not dissolve. This is important when it is considered that there will be substantial periods of time during which the side stream will be in contact with the iodine but no make-up water will be required in the system.

In addition, since the amount of biocide chemical usage can be controlled, it is possible to calculate the amount of biocide usage for a given system. In fact, if the container holding the solid biocide chemical is sized correctly, it is possible to provide sufficient iodine which will last an entire operating season.

The method of the present invention is also automatic. The process for adding make-up water to evaporative cooling equipment must necessarily be automatically controlled due to the constantly changing demand for make-up water. Therefore, by adding the biocide chemicals into the make-up water supply, the present invention utilizes the automatic control system already in place. This prevents having duplicative equipment and minimizes the first cost of the biocide treatment system. Further, since the addition of the biocide chemicals to the make-up water is accomplished through the use of static equipment, there are fewer mechanical parts to maintain.

The present invention also is a significant improvement over the slug-feed method of biocide control because it inexpensively provides a means for maintaining a relatively constant supply of biocide chemical within the system. This eliminates the health hazard caused by large concentrations of pathogenic organisms that could potentially occur in systems being slug-fed biocide chemicals.

BRIEF DESCRIPTION OF THE DRAWINGS

In the figures of the drawings, like reference numerals identify like components, and in the drawings.

DETAILED DESCRIPTION

Figure 1:
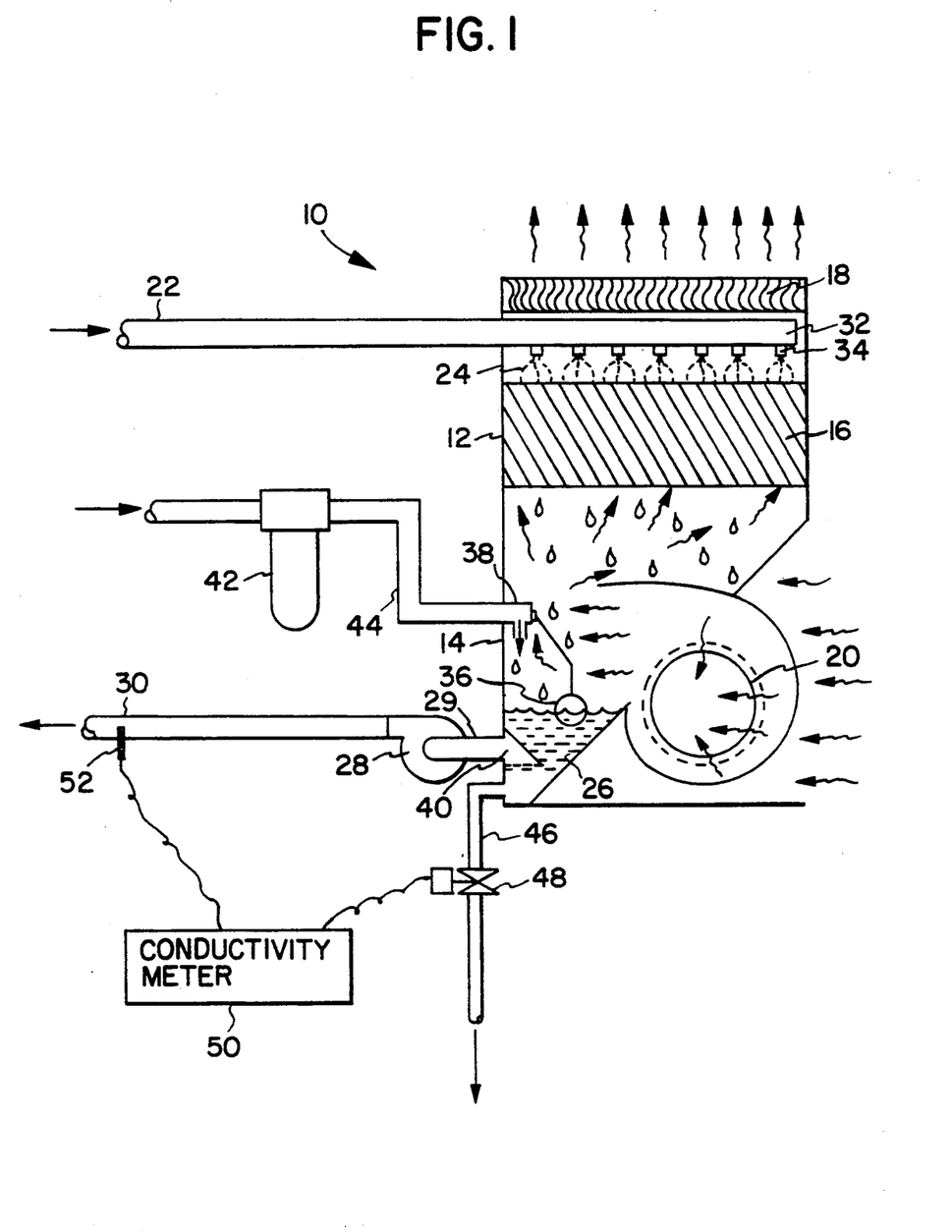
FIG. 1 is an elevational, cross-sectional view of a cooling tower utilizing the improved biocide chemical method and apparatus in accordance with the present invention.

Referring now to FIG. 1, there is shown generally at 10 an elevation, cross-sectional view of a cooling tower provided with the water treatment system in accordance with the present invention. Although a cooling tower is shown on FIG. 1, the present invention could be utilized with any type of evaporative cooling equipment such as evaporative condensers, closed-circuit fluid coolers, direct evaporative coolers, as well as others. Also, cooling tower 10 is shown as a forced draft counterflow cooling tower, though the present invention could be utilized with other types of cooling towers such as induced draft counterflow, cross-flow, natural draft hyperbolic, among other types.

Cooling tower 10 comprises outside casing 12 and collection basin 14. Attached to casing 12 is fan 20, which could be a centrifugal or squirrel cage fan, as shown, or an axial fan. Cooling tower 10 also comprises drift particle eliminators 18, which typically consist of a plurality of thin plastic or metal sheets arranged to prevent entrained moisture particles from passing through eliminators 18 and outside of cooling tower 10.

Recirculated water spray header 32 passes through casing 12 into cooling tower 10. Spray header 32 typically is constructed of galvanized or polyvinyl chloride (PVC) piping. Orifice nozzles 34 are attached to spray header 32 and are typically manufactured of a plastic material such as polypropylene, though other similar plastic materials are often utilized.

Positioned below spray header 32 is heat transfer media 16. Heat transfer media 16 generally comprises a plurality of thin plastic sheets over which the recirculated water passes. Heat transfer media 16 is generally designed to maximize the heat transfer surface area between the air and recirculated water while minimizing the pressure drop of the air flow through cooling tower 10.

Suction screen 40 is located in basin 14. Suction screen 40 is connected to circulating pump 28 via line 29. Suction screen 40 typically comprises a metallic screen, such as galvanized or stainless steel, and is intended to prevent debris from leaving basin 14. Circulating pump 28 is connected to line 30 which transports the recirculating water back to the process requiring cooling.

Blow down line 46 extends from basin 14 of cooling tower 10 to a drain not shown in the figure. The purpose of blow down line 46 is to provide a means for removing a portion of the recirculated water to control the level of dissolved solids within the system. Valve 48 is positioned in blow down line 46 to control the amount of recirculated water that is bled from basin 14. Typically valve 48 is connected to conductivity meter 50 which measures the conductivity of the recirculated water via conductivity probe 52 which usually is located within line 30. When the dissolved solids in the recirculated water increase, the electrical conductivity of the water also increases. When the conductivity of the recirculated water reaches a pre-set level, conductivity meter 50 typically transmits a signal to valve 48 to open and allow a portion of the recirculated water to escape from basin 14. Although it is preferred that an automatic blow-down system as that described above be utilized with the present invention, manual blow-down methods may also be utilized to control the dissolved solids' level in the recirculated water.

As a result of the need to add additional water to the evaporative cooling system to replace the water lost from the system due to evaporation and blow down, a make-up water control apparatus is typically utilized. The make-up water control system in FIG. 1 is shown as float ball 36 and mechanical valve 38, although alternative make-up control devices, such as electronic level controllers and valves, could be utilized.

Float ball 36 is connected to mechanical valve 38 which, in turn, is connected to make-up water supply line 44. Located within the make-up supply line is canister 42, in accordance with the present invention, which is filled with solid biocide chemicals.

Figure 2:
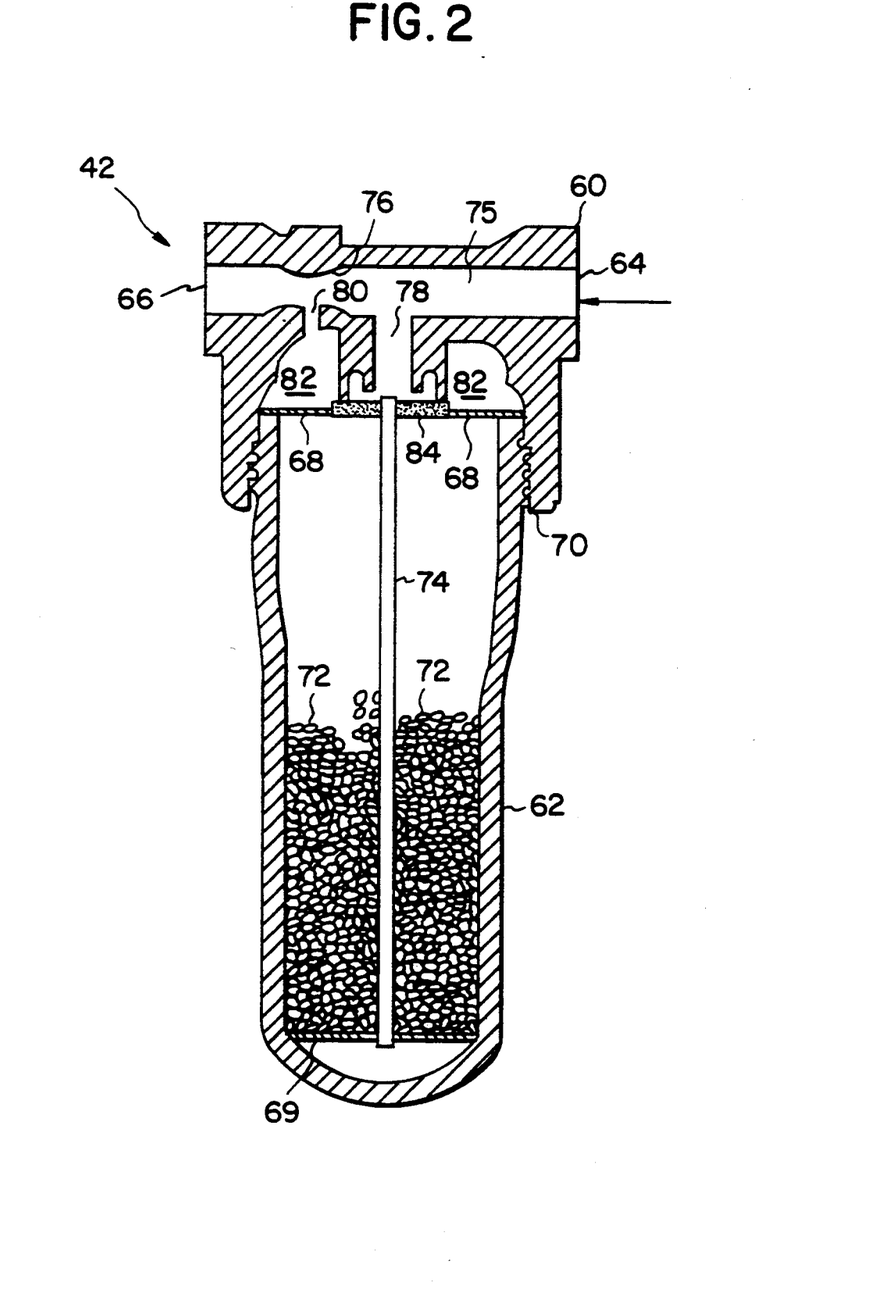
FIG. 2 is a cross-sectional view of a biocide chemical canister device in accordance with the present invention.

A close-up view of canister 42 is shown in FIG. 2. Typically, canister 42 comprises a top housing 60 and a bottom container 62. Bottom container 62 and top housing 60 are usually connectable via screw type threads 70, though other types of connection methods could be utilized. Canister 42 is typically molded of polypropylene, through other similar plastic materials could be utilized.

Figure 3:
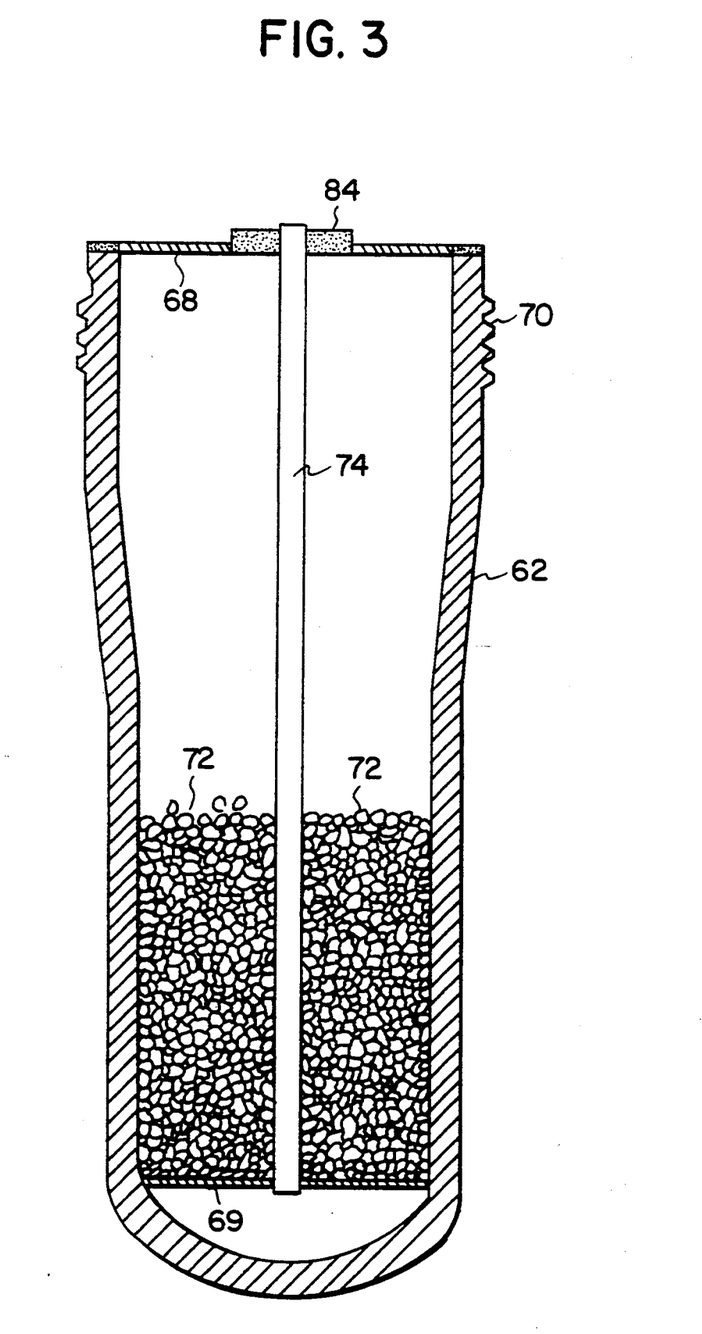
FIG. 3 is a cross-sectional view of the bottom section of the biocide chemical canister in accordance with the present invention.

Referring now to FIG. 3, bottom container 62 is typically provided with top restraining screen 68 and bottom restraining screen 69 which are used to contain a solid form biocide chemical, shown generally as 72. Top restraining screen 68 and bottom restraining screen 69 are typically thin, perforated plastic or metallic sheets which are designed to allow water to flow through the screen while restraining biocide 72 within the confines of container 62.

Initially, bottom container 62 is completely filled with biocide chemical 72. As water flows through bottom container 62, biocide chemical 72 is depleted and the level of biocide chemical will be reduced, as shown in the figure. In the preferred embodiment, biocide chemical 72 is in the form of round spheres, or particles, although other solid form shapes could also be utilized.

The mesh size of top restraining screen 68 is critical to the proper operation of the present invention. In general, the mesh size must be small enough to confine biocide chemical 72 within container 62. Conversely, the mesh size must be large enough to allow water to pass through with minimal restriction. In addition, it is desired that the mesh size be large enough to pass the very small biocide chemical beads which become fluidized during operation of the device and would otherwise block the passageways of top restraining screen 68 if not passed through.

In the preferred embodiment of the present invention, biocide or treatment chemical 72 has a density significantly greater than that of water. Accordingly, as the water flows up through biocide chemical 72 bed, the majority of biocide chemical 72 remains in the bottom of the container 62. However, as biocide chemical 72 dissolves, the chemical beads become smaller in size until a point is reached where the drag on some of the biocide chemical particles created by flow of water through the bed is greater than the gravitational force on the particle. When this point is reached, the biocide chemical particle will become fluidized and will be carried to the top of container 72. The mesh of top restraining screen 68 is preferably large enough to pass such particles through top restraining screen 68 and into the main stream of make-up water. In its preferred embodiment top restraining screen 68 will have a mesh with openings of about 0.020 inches.

Tube 74 is also included in bottom container 62. Tube 74 extends from a top side of bottom container 62 down through the center of bottom container 62 and through bottom restraining screen 69. The purpose of tube 74 is to transport a flow of fluid from top housing 60 down to the bottom of bottom container 62.

When bottom container 62 and top housing 60 are connected, gasket 84 engages top housing 60 to provide a water tight seal. Gasket 84 is preferably made of ethylene propylene dimonomer rubber or silicone rubber, though other similar rubber materials could be utilized. In FIG. 2, it can be seen that the purpose of gasket 84 is to prevent the make-up water from bypassing the chemical bed and leaking from opening 78 directly into chamber 82.

Figure 4:
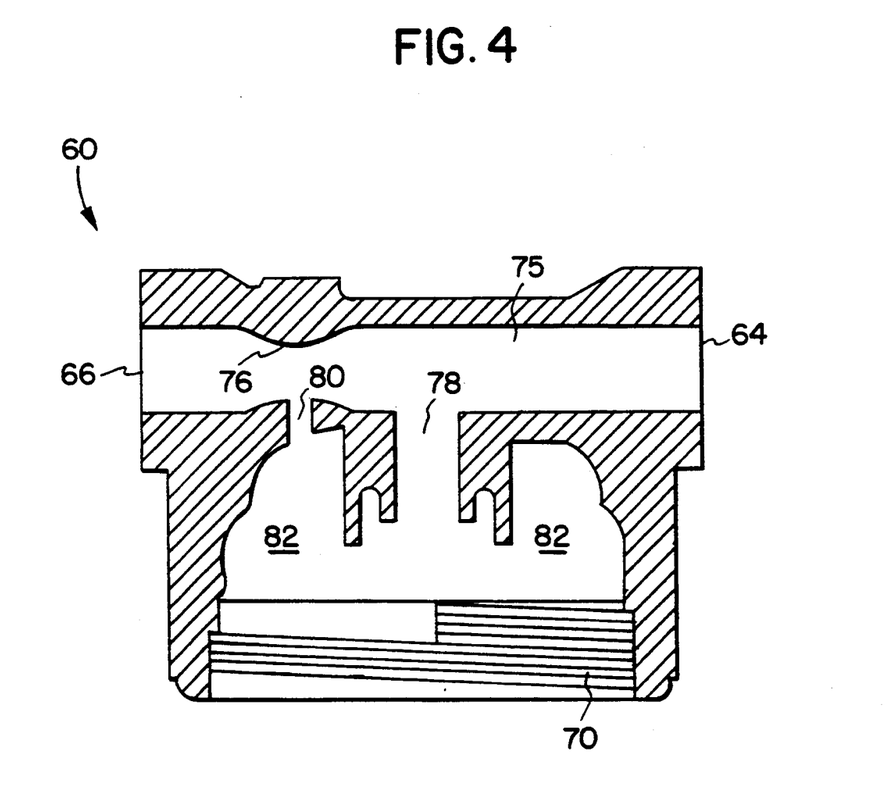
FIG. 4 is a cross-sectional view of the top section of the biocide chemical canister in accordance with the present invention.

Referring now to FIG. 4, top housing 60 is provided with inlet 64 for receiving incoming make-up water flow and with outlet 66 for passing the make-up flow out of top housing 60 and back into the make-up supply line. Venturi 76 is positioned in the water flow path in top housing 60 between inlet 64 and outlet 66. The purpose of venturi 76 is to accelerate the water flow through the top housing in order to create a side-stream flow of make-up which will be brought in contact with biocide chemical 72 contained within bottom container 62.

Typically, venturi 76 will have a smooth, generally circular entrance and exit as is shown on the figure. This arrangement is preferred in order to minimize the turbulence of the flow through venturi 76. However, a similar effect could be obtained if, instead of using smooth venturi 76, an orifice plate or some other restriction to flow was utilized.

Referring back to FIG. 2, the creation of the side stream flow of make-up water will be explained. The side-stream flow of water is created by positioning side stream inlet 78 in top housing 60 just prior to venturi 76. In addition, side stream outlet 80 is positioned within venturi 76. As the make-up water flows through top housing 60, the majority of the flow passes through venturi 76 and outlet 66. However, as the make-up water flows through top housing 60, an area of low static pressure is created within and downstream of venturi 76. Accordingly, the static pressure of the water at side stream outlet 80 is less than the static pressure of the water at side stream inlet 78.

As a result of this difference in static pressures, a small portion of the make-up flow is split apart from the major flow stream and is forced through side stream inlet 78. Once the side stream has passed through side stream inlet 78, the side stream is forced down through tube 74, back up through biocide chemical 72, through chamber 82 and side stream outlet 80. As the side stream flows through side stream outlet 80, it rejoins, and is mixed back into, the main make-up flow.

In the preferred embodiment of the invention, the biocide chemical used in bottom container 62 is prilled elemental iodine. Prilled elemental iodine is preferred for several reasons. First, elemental iodine has a relatively low solubility in cool water of approximately 300 mg/l. This low solubility coupled with the relatively long contact time of the side stream flow with biocide 72 allows the side stream flow to reach a constant, elemental iodine saturation concentration.

Preferably, the iodine concentration within the recirculating water should be held between 0.1 ppm and 0.5 ppm. It has been found that if the make-up water added to the recirculating water has an iodine concentration of about 3.0 ppm iodine, the level of iodine within the recirculating water will be within the 0.1 to 0.5 ppm range. Accordingly, in order to achieve a 3.0 ppm iodine concentration in the make-up water stream, it is necessary that the side stream flow constitute about 1% of the total make-up water flow through device 42. When this side stream, having a constant 300 ppm iodine concentration, is re-mixed into the main make-up water flow stream, the resulting mixture will have a constant iodine concentration of about 3 mg/l. It is recognized, however, that differing iodine concentrations could be obtained, and may be preferred in certain instances, by varying the volume of the side stream flow.

The low solubility of iodine also prevents excessive iodine from being dissolved and wasted during times when the addition of make-up water is not required. During such periods, the side stream will remain in contact with biocide chemical 72 within bottom container 62. However, due to the low solubility of elemental iodine, the only iodine that will dissolve into the side stream is the amount which is necessary to saturate the side stream. Once this saturation level is reached, no additional iodine will dissolve. This feature allows the supply of iodine in bottom container 62 to last for extended periods of time. In fact, it is possible to calculate an amount of iodine which, if placed within bottom container 62, will last for an entire operating season.

Although prilled elemental iodine is preferred, the present invention could also be utilized with other oxidizing biocides such as chlorine or bromine compounds and other organic or inorganic biocides which are slightly soluble in water. However, the degree of solubility of alternative biocides will have to be considered if all the anticipated features of the present invention are to be realized.

It is anticipated that the present invention will find most use in systems utilizing evaporative cooling equipment in the small to mid-size range, that is with equipment of up to about 350 to 400 tons. When used with equipment of this size, it is possible to provide sufficient iodine to last for an entire operating season within a canister of a reasonable size. In addition, systems in the small to mid-size range often are left untreated, or are treated using the slug-feed method, due to the high cost of installing automatic chemical feed equipment. As a result, the present invention will provide a much improved means for cost-effectively treating such systems.

In typical applications, it is estimated that approximately 0.1 pound of iodine per ton of cooling will be required to supply iodine to an evaporative cooling system for an entire season. This amount of iodine is based upon the assumption that the evaporative cooling equipment will operate at about five cycles of concentration. Of course, if the evaporative cooling equipment is operated at other than 5 cycles of concentrations, or if the operating season is longer or shorter than that assumed in this estimate, the amount of iodine that will be required to last an entire season may change.

Usually, the canisters used in accordance with the present invention will be approximately 3 to 8 inches in diameter and about 6 to 36 inches in length. With canisters of this size, passageway 75 will usually be about 0.63 to 1.0 inches in diameter.

In order to create a side stream flow equal to about 1% of the total flow in the preferred embodiment of the present invention, the cross-sectional flow area of venturi 76 will generally need to be equal to about 50% of the cross-sectional flow area of passageway 75. Generally, side stream inlet 78 is oversized and provides minimal restriction to the side stream flow. However, the size of side stream outlet 80 must be controlled and matched with the size of venturi 76 so that a sufficient restriction to flow will be provided in order to prevent excessive side stream flow. For example, if a venturi having a diameter of 0.59 inches is utilized, side stream outlet 80 will need to be about 0.09 inches in diameter. However, other combinations of venturi size and side stream outlet sizes could also be used.

An important feature of the present invention is that the biocide chemical is added to the evaporative cooling equipment in proportion to the need for biological control within the system. As shown by FIG. 1, this is accomplished by adding the biocide chemical contained in canister 42 via the make-up water supply 44.

It is known in the art that the growth rate of microbiological organisms in evaporative cooling equipment typically increases as the recirculating water temperature increases. In most evaporative cooling systems, the recirculating water temperature increases as the load on the equipment, or the amount of heat that must be rejected from the equipment, increases.

It is also known in the art that as the load on evaporative cooling equipment increases, the amount of water that is evaporated from the equipment must necessarily increase to provide the required cooling. In addition, it is also necessary to increase the blow down rate from the tower as the evaporation rate increases in order to maintain the level of dissolved solids at a relatively constant level. Due to the increase in the loss of water from the system from increased evaporation and increased blow down rate at high loads, it is necessary to correspondingly increase the amount of make-up water flow to the equipment in order to maintain sufficient water within the system.

Since the amount of make-up water added to the system is approximately proportional to the load on the evaporative cooling equipment, and since the load on the system is approximately proportional to the rate of microbiological growth within the evaporative cooling equipment, it logically follows that the rate of make-up water added to an evaporative cooling system is approximately proportional to the rate of microbiological growth within the system.

The present invention utilizes this relationship to provide a method of biocidal water treatment that automatically, without expensive automatic chemical feed equipment and daily operator attention, adds biocide chemical in proportion to the need for microbial control within evaporative cooling systems. This minimizes the chemical waste which is present with most systems and is a significant advantage over prior art systems which typically add biocide chemical on a timed basis.

For example, typical evaporative cooling equipment used on comfort cooling, or air conditioning, systems operate at their maximum capacity for less than 10% of the time the equipment is in operation. Accordingly, if, in a prior art time based, automatic biocide feed system, the rate of biocide addition is set based upon the maximum biological growth rate, the prior art system would overfeed biocide chemical approximately 90% of the time.

On the other hand, if the timed rate of biocide addition in such a prior art system were based on the average biological growth rate, the prior art system would overfeed and waste biocide chemical at times when the load on the equipment was small and the recirculating water temperature was low. Similarly, such prior art system would underfeed biocide chemical at times of high load when the recirculated water temperature was high. If harmful pathogens are present within the system, this underfeed situation could allow the concentration of harmful pathogens in the system to increase to potentially dangerous levels.

Although the method and apparatus of the present invention has been described for the preferred embodiment, it is apparent that various modifications and alternatives can be made thereto without departing from the scope and spirit of the invention, which is defined in the following claims.

We claim:

1. A method for treating a body of water in an evaporative cooling system comprising the steps of:

providing a device containing a treatment chemical;

conveying a flow of make-up water to said device, said make-up water being generally fresh water used to replenish the body of water, providing said device with a passageway for said flow of make-up water to pass through, said passageway being provided with an inlet and an outlet and with a portion of said passageway being of reduced cross-sectional flow area;

dividing said flow of make-up water passing through said device into a primary flow stream and a secondary flow stream by providing a first opening positioned in said passageway between said inlet and said area of reduced cross section, said secondary flow stream passing directly through said first opening from said passageway, contacting said secondary flow stream with said treatment chemical;

saturating said secondary flow stream with said treatment chemical;

providing a second opening within or downstream of said area of reduced cross-section such that when said flow of make-up water passes through said passageway, said secondary flow stream passes into said first opening and is induced to return to said passageway via said second opening, thereby mixing said primary flow stream and said saturated secondary flow stream and thereby creating a flow of make-up water having a substantially constant treatment chemical concentration, and delivering said make-up water to said body of water requiring treatment at times and in quantities substantially proportional to the flow rate of make-up water, with the only control on the ratio of the primary flow stream and secondary flow stream being the ratio of the area of the passageway to the area of the reduced cross section.

2. The method of claim 1 wherein said secondary flow stream comprises approximately 0.5-2% of said flow of fluid passing through said device.

3. The method of claim 1 wherein said treatment chemical comprises iodine.

4. The method of claim 3 comprising the further steps of providing said iodine in the form of a plurality of beads and arranging said beads in a bed within said device.

5. The method of claim 1 wherein said separate body of water comprises the recirculated water in an evaporative heat exchange system.

6. The method of claim 5 wherein said flow of make-up water passing through said device comprises the make-up water flow into said evaporative heat exchange system.

* * * * *